2,992,155
PROCESS FOR MANUFACTURING RAYON PULP OF HIGH PURITY FROM BAGASSE

Shinji Okuno, deceased, late of Kitaku, Tokyo-to, Japan, by Hiroshi Okuno, heir, Kitaku, Tokyo-to, and Takasuke Okuno, Hatogaya-machi, Kita Adachi-gun, Tokyo-to, Japan
No Drawing. Filed Nov. 6, 1956, Ser. No. 620,574
3 Claims. (Cl. 162—55)

This invention relates to a process for manufacturing rayon pulp or other pulp of high purity from bagasse.

Bagasse contains much pentosan or like hemi-cellulose and ash (chiefly silicic acid) in comparison with wood, especially that from needle-bearing trees. Pentosan in needle-bearing trees is 10%, while that of bagasse being 25%, corresponds to about 2.5 times that of the former. Ash in needle-bearing trees is 0.2–0.3% while that of bagasse being 2–3% corresponds to about 10 times that of the former. These impurities are chiefly contained in the soft cellular structure of bagasse, called pith. Pith is poor in cellulose and lowers the alkali absorbing power in the mercerizing treatment of pulp. Further these impurities are injurious to the transparency and filterability of viscose, and lower the strength of the artificial silk obtained.

According to the present invention bagasse is loosened in the dry state before being boiled, and is screened so as to remove the greater part of the powdered pith, and the fiber is selected. This is the first step of the invention.

This selection of fiber when practiced according to the known process of loosening bagasse and selecting fiber in the presence of much water, causes an incomplete removal of pith for rayon pulp. The loss of fiber is great in comparison with the process of the present invention, and the yield rate of α-cellulose is lowered. Ash and hemi-cellulose remain much as seen in Table 1. Wet bagasse prevents the permeation of liquid in the acetic acid treatment to be later effected, so that unevenness and loss of quality of pulp result as seen in Table 3. Rayon pulp of high purity can not be obtained by the wet process.

Furthermore in the wet process, the pith powder is mixed with much water and its collection and use is troublesome, while according to the dry process of the present invention collection of pith is easy and it can be easily used for fuel or other purpose.

Table 1 shows the analysis of selected bagasse fiber and pith obtained by the process of the present invention and that of a known process (Japanese Patent No. 72,278).

It is seen in Table 1 that, according to the process of Japanese Patent No. 72,278, the quantity of pentosan or like hemi-cellulose and ash remaining in selected bagasse fiber is great, and owing to the flowing off of good fiber the content of α-cellulose in the selected bagasse becomes reduced.

When pulps are manufactured, under the same conditions, by treating bagasse according to the wet and dry process, and the pulps are made into viscose, the product of Japanese Patent No. 72,278 contains much undissolvable fiber, and is inferior as to the filtering power of the viscose while the product according to the present invention is substantially similar to ordinary wood rayon pulp in the market.

Furthermore the wet process as in Japanese Patent No. 72,278 needs much water and it is troublesome to carry out.

In carrying out the present invention, bagasse selected by the dry process is introduced into a digester, and is treated with fresh acetic acid solution of 0.05–0.2%, whose pH is adjusted at 4–5, under a temperature of 150–170° C. for 1–2 hours, to decompose and extract pentosan or like hemi-cellulose and silicic acid. The present invention is characterized in that in the pretreatment of selected bagasse with acid solution, fresh acetic acid solution is used for every batch. The inventor discovered that every known process for treating wood chip, such as using sulphite or other inorganic acid, or boiling with water, or using waste liquor of acid treatment, is not adapted for the purpose of manufacturing good rayon pulp from bagasse, which differs in ingredients from wood, for the reason that the content of α-cellulose is little, and pentosan or like hemi-cellulose and ash is great in the rayon pulp manufactured.

As seen in Table 2, inorganic acid is too strong, and when treated under the conditions adapted to decompose pentosan, bagasse fiber undergoes at the same time hydrolysis, so that the nature of pulp manufactured becomes lowered and the yield of pulp decreased. Inorganic acid treatment, therefore, is not adapted for bagasse.

When water is used the reaction being too slow much time is spent for the formation of acetic acid or like organic acids while hydrolysis of α-cellulose occurs at the same time, and the nature of the pulp becomes lowered and yield reduced. Waste liquor of acid treatment of bagasse contains much furfural and silicic acid in comparison with that of wood. Waste liquor of acid treatment of wood, therefore, may be re-used for wood chip, but that of bagasse is not adapted to re-use for the

TABLE 1.—ANALYSIS, DRY AND WET REFINING PROCESS COMPARED

| Item | raw bagasse | Dry process according to the present invention | | Wet process according to Japanese Pat. No. 72,278 | |
|---|---|---|---|---|---|
| | | refined bagasse | screened pith | refined bagasse | screened pith |
| α-cellulose (percent) | 33.1 | 36.4 | 23.9 | 34.7 | 28.6 |
| Pentosan (percent) | 25.3 | 22.8 | 28.2 | 24.4 | 27.5 |
| Ash (percent) | 2.6 | 1.1 | 3.1 | 1.9 | 2.6 |
| Silicic Acid (percent) | 2.1 | 0.9 | 2.3 | 1.4 | 1.9 |
| Mean fiber length, mm | 1.83 | 2.51 | 0.45 | 2.33 | 0.64 |
| Yield of refined bagasse (percent) | | 77.2 | 22.8 | 69.2 | 30.8 |
| Filtering degree of viscose for 30 minutes (percent) | 12.7 | 68.3 | | 42.6 | |
| Number of fibers not dissolved in viscose per 1,000 cc | {86,400 [1], innumerable [2]} | [1] 7,200 [2] 17,500 | | [1] 37,400 [2] 99,300 | |

[1] Intermediate.
[2] Small.

reason that owing to the increase of pentosan the solubility of fiber and the filtering power of viscose become lowered. In carrying out the present invention, therefore, it is absolutely necessary to use fresh acetic acid solution for every batch, and the result may be seen from the data shown in Table 2.

Table 2 shows the result of analysis of bagasse pulps obtained from the same raw bagasse selected in the same manner and pretreated respectively with acetic acid, waste liquor of acetic acid, sulphuric acid, sulphurous acid and water.

TABLE 2.—ANALYSIS OF ACID PRE-TREATED BAGASSE PULPS

| Classification | Acids used | | | | |
|---|---|---|---|---|---|
| | Acetic acid | Waste liquor of acetic acid | Sulphuric acid | Sulphurous acid | Water |
| $\alpha$-cellulose (percent) | 97.20 | 94.15 | 91.63 | 86.26 | 93.84 |
| $\beta$-cellulose (percent) | 1.64 | 3.87 | 5.78 | 11.52 | 4.81 |
| Pentosan (percent) | 1.08 | 2.84 | 7.72 | 7.31 | 2.07 |
| Ash (percent) | 0.08 | 0.31 | 0.36 | 0.45 | 0.18 |
| Silicic Acid (percent) | 0.06 | 0.23 | 0.27 | 0.36 | 0.13 |
| Copper value | 0.23 | 0.76 | 1.47 | 1.10 | 1.24 |
| Viscosity | 4.42 | 3.92 | 3.80 | undissolved part is much. | 3.28 |
| Yield of pulp (percent) | 35.20 | 34.71 | 33.26 | 36.83 | 24.27 |
| Yield of $\alpha$-cellulose (percent) | 94.0 | 89.8 | 83.8 | 87.3 | 62.5 |
| Filter degree of viscose (percent) for 30 min. | 68.3 | 47.7 | 34.7 | 18.7 | 42.2 |
| Number of fiber not dissolved in viscose | [1] 7,200 [2] 17,500 | [1] 20,600 [2] 53,400 | 78,200 [1] innumerable [2] | innumerable [1] do [2] | [1] 34,100 [2] 87,900 |

[1] Intermediate.
[2] Fine.

As seen in Table 2, when acid pretreatment of bagasse is executed with inorganic acid or water, other than acetic acid, the yield of $\alpha$-cellulose is little, and impurities such as $\beta$-cellulose, pentosan and ash are substantial, so that they are not adapted for rayon pulp of high purity. The use of waste liquor, unlike the case of wood, brings imperfect removal of pentosan and silicic acid, owing to the fact that waste liquor contains much furfural and siliciferous matter, and the removal of pentosan and silicic acid becomes imperfect, so that the solubility of pulp and the filtering power of viscose becomes lowered. The use of waste liquor is not adapted for bagasse. In the acid pretreatment of bagasse, in carrying out the present invention, therefore, the use of fresh acetic acid solution is absolutely necessary.

After bagasse has been pretreated, it is fully washed with water, and then is boiled with caustic soda or the mixed solution of caustic soda and sodium sulphide according to the known process to be bleached and refined. The yield of pulp is very high at the rate of 33–35%. The nature of the pulp obtained shows no inferiority compared with ordinary rayon pulp obtained from wood, as to the purity of pulp.

An example of carrying out the present invention is explained as follows.

Raw bagasse is scratched and loosened in fiber bundle by a loosener like a rag machine, and is sieved by a screen netting of about 30 mesh, to remove the powdered pith. The selected fiber is then introduced into a spherical rotary digester, and added with 7 times its weight of fresh acetic acid solution of 0.1, whose pH is adjusted at 4–5, is heated at 165° C. under pressure of 6 kg./cm.$^2$ for 1.5 hours. Pretreated bagasse is taken out of the digester and after being fully washed with water is again introduced into the digester, and is added with mixed solution containing 9% caustic soda and 2% sodium sulphide, based upon the net weight of bagasse, and is heated under 165° C., 6 kg./cm.$^2$ for 2.5 hours. The boiled bagasse is then subjected in turn to chlorine treatment, alkali treatment and bleaching powder treatment according to the known process.

Table 3 shows the nature of bagasse pulp obtained by the present process compared with the known process.

TABLE 3.—ANALYSIS OF BAGASSE PULPS COMPARED

| Item | Classification | | | |
|---|---|---|---|---|
| | A | B | C | D |
| $\alpha$-cellulose (percent) | 97.20 | 92.46 | 92.05 | 85.73. |
| $\beta$-cellulose (percent) | 1.64 | 5.86 | 6.61 | 11.35. |
| Ash (percent) | 0.08 | 0.18 | 0.22 | 0.48. |
| Pentosan (percent) | 1.08 | 5.23 | 7.58 | 12.33. |
| Copper value | 0.23 | 1.12 | 1.90 | 1.78. |
| Viscosity | 4.42 | 4.04 | 3.65 | 4.02. |
| Yield of pulp (percent) | 35.2 | 34.7 | 33.6 | 34.2. |
| Use | high class rayon | low class rayon | not adapted for rayon; paper use. | not adapted for rayon; paper use. |

A. Bagasse pulp of the present process.
B. Bagasse pulp of Japanese Pat. No. 139,926 (sulphite-Nitric acid process).
C. Bagasse pulp prepared by sulphuric acid pretreatment and finished by Kraft process.
D. Bagasse pulp of Japanese Patent No. 72,278 (pith wet removed and finished by ordinary sulphite process).

As seen in Table 3, according to the known process, other than the present invention, the quantity of $\alpha$-cellulose being small, and impurities such as $\beta$-cellulose, ash and pentosan being present in large amounts, and it is not adapted for high quality rayon pulp, whereas according to the present invention raw bagasse is loosened and screened in the dry state to remove the pith, selected raw fiber is pretreated with fresh acetic acid solution, and then subjected to known alkali boiling and bleaching treatment, whereby excellent rayon pulp of high purity, may be obtained. The invention is new and useful in this respect.

We claim:

1. In the process of manufacturing rayon pulp of high purity from bagasse, the steps which comprise loosening raw bagasse and screening the loosened dry bagasse in the dry state to remove the pith powder, preparing a fresh acetic acid solution of a concentration of 0.05 to 0.2%, boiling the fibers recovered from the screening step in said solution to remove pentosan and silicic acid, and treating the boiled fibers with a caustic soda solution.

2. A process as defined in claim 1, wherein said caustic soda solution contains sodium sulphide.

3. In the process of manufacturing rayon pulp of high purity from bagasse, the steps which comprise loosening raw bagasse and screening the loosened dry bagasse in the dry state to remove the pith powder, preparing a fresh acetic acid solution of a concentration of 0.05 to 0.2% and a pH of about 4 to 5, boiling the fibers recovered from the screening step at a temperature of 150 to 170° C. for about 1 to 2 hours in said solution to remove pentosan and silicic acid, and treating the resultant boiled fibers with a caustic soda solution.

References Cited in the file of this patent

UNITED STATES PATENTS

| | | |
|---|---|---|
| 659,784 | Bohm | Oct. 16, 1900 |
| 1,509,273 | Von Ehrenthal | Sept. 23, 1924 |
| 1,817,972 | De la Roza | Aug. 11, 1931 |
| 1,838,326 | Richter | Dec. 29, 1931 |
| 1,847,050 | Williams | Feb. 23, 1932 |
| 1,918,250 | De la Roza | July 18, 1933 |
| 2,106,797 | Dreyfus | Feb. 1, 1938 |
| 2,625,474 | Atkinson et al. | Jan. 13, 1953 |
| 2,645,633 | Richmond et al. | July 14, 1953 |
| 2,731,345 | I-Tsai Jen | Jan. 17, 1956 |

FOREIGN PATENTS

| | | |
|---|---|---|
| 395,119 | Germany | May 14, 1924 |
| 322,763 | Great Britain | Dec. 2, 1929 |
| 594,835 | Great Britain | Nov. 29, 1947 |
| 461,954 | Canada | Dec. 20, 1949 |